(12) United States Patent
Silsby et al.

(10) Patent No.: US 7,817,187 B2
(45) Date of Patent: Oct. 19, 2010

(54) IMAGE BLUR CORRECTION USING A SECONDARY CAMERA

(75) Inventors: Christopher D. Silsby, Loveland, CO (US); Peter David Cooper, Grays Point (AU)

(73) Assignee: Aptina Imaging Corporation, Grand Cayman (KY)

( * ) Notice: Subject to any disclaimer, the term of this patent is extended or adjusted under 35 U.S.C. 154(b) by 697 days.

(21) Appl. No.: 11/769,248

(22) Filed: Jun. 27, 2007

(65) Prior Publication Data

US 2009/0002501 A1    Jan. 1, 2009

(51) Int. Cl.
*H04N 5/228* (2006.01)
(52) U.S. Cl. .............. 348/208.99; 348/208.6
(58) Field of Classification Search ........ None
See application file for complete search history.

(56) References Cited

U.S. PATENT DOCUMENTS

| | | | |
|---|---|---|---|
| 7,440,634 B2* | 10/2008 | Ben-Ezra et al. | 382/255 |
| 7,564,482 B2* | 7/2009 | Clarke et al. | 348/208.1 |
| 7,598,979 B2* | 10/2009 | Trutna et al. | 348/208.4 |
| 7,619,656 B2* | 11/2009 | Ben-Ezra et al. | 348/208.4 |
| 7,626,612 B2* | 12/2009 | John et al. | 348/208.4 |
| 7,714,892 B2* | 5/2010 | Clark et al. | 348/208.99 |
| 2007/0064144 A1 | 3/2007 | Trutna, Jr. et al. | |
| 2007/0076982 A1* | 4/2007 | Petrescu | 382/294 |
| 2007/0120997 A1* | 5/2007 | Sasaki et al. | 348/362 |
| 2007/0154202 A1* | 7/2007 | Lee et al. | 396/153 |

FOREIGN PATENT DOCUMENTS

WO    WO 2006043315 A1 *   4/2006

OTHER PUBLICATIONS

Chitale, et al., "Blur Identification and Correction for a Given Imaging System", Southeastern '99 Proceedings IEEE, 1999, pp. 268-273, Lexington, KY.

* cited by examiner

*Primary Examiner*—Justin P Misleh
(74) *Attorney, Agent, or Firm*—RatnerPrestia (57) ABSTRACT

A device that employs a secondary camera for use in image blur correction. The device includes a first camera that acquires a digital image and a second camera that acquires a series of digital images that enable a determination of a motion of the device during acquisition of the digital image. The determined motion may be used to correct an image blur in the digital image acquired with the primary camera.

24 Claims, 4 Drawing Sheets

IMAGE BLUR CORRECTION USING A SECONDARY CAMERA

FIELD OF THE INVENTION

The invention relates generally to digital imaging and, more particularly, to image blur correction of digital images from a primary camera using a secondary camera.

BACKGROUND OF THE INVENTION

A wide variety of devices include a camera for acquiring digital images. Examples of devices that may include a camera for acquiring digital images include handheld devices, e.g., cell phones, PDAs, and handheld computers, among others.

A digital image acquired by such a device may include image blur. Image blur may be caused by movement of the device during digital image acquisition.

A digital image that includes image blur caused by the movement of the device may be corrected by measuring the movement of the device and then removing the image blur from the digital image based on the measured movement. One technique for measuring the movement of a device to correct image blur may include equipping the device with an accelerometer. An accelerometer, however, may increase the cost of the device and may undesirably increase the bulk of the device.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Moreover, common numerical references are used to represent like features/ elements. Included in the drawing are the following figures.

DETAILED DESCRIPTION

Blur correction may be used in many different application. Devices, such as cameras, cell phones, PDAs, and handheld computers may encounter image blur due to motion of the device during image capture (sampling). For example, a handheld device inadvertently may be moved by a user when activating a camera shutter control on the device. The inventors of the present invention have discovered that movement of the device may be due to, for example, (i) depression of the control button for operating the camera, (ii) movement of the camera shutter during operation; (iii) movement of the zoom and autofocus positions during operation of the camera; and (iv) release of the control button. These movements generate non-linear motion of the device, which may be estimated from frequency response characteristics of the movement.

A secondary camera in such a handheld device may be used for image blur correction, and may be shared for other functions, such as video. Thus, the economic impact of an additional camera in a handheld device may be minimized. For example, the primary camera may provide higher resolution images, while the secondary camera provides lower resolution images at higher speeds.

Figure 1:
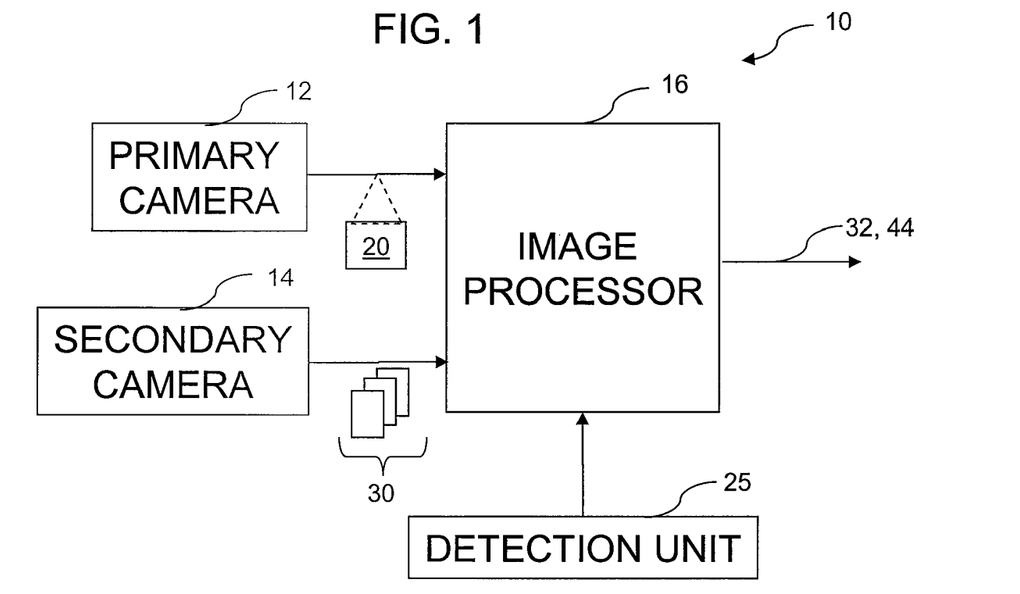
FIG. 1 is a block diagram illustrating a device in accordance with an embodiment of the invention.

FIG. 1 is a diagram illustrating a device in accordance with an embodiment of the invention. As shown, device 10 may include primary camera 12 and secondary camera 14. Primary camera 12 may acquire digital image 20 and secondary camera 14 may acquire a series of digital images 30. The digital images 30 from secondary camera 14 may enable a determination of motion of device 10.

The primary camera 12 and secondary camera 14 may each include an array of light sensing elements. Each array of light sensing elements may sample incident light to provide (i.e., construct) one or more digital images. Primary camera 12 may be configured to acquire relatively high quality, e.g., high resolution, digital images relative to that of secondary camera 14. For example, the array of primary camera 12 may have 1 to 20 mega-pixels. In certain embodiments, primary camera 12 may include a CMOS electronic rolling shutter (ERS) image sensor.

Although primary camera 12 is disclosed as including a CMOS sensor, it is contemplated that primary camera 12 may include any type of sensor element which forms a digital image including a CCD image sensor.

Although the primary camera is shown as including an ERS image sensor, it is contemplated that primary camera 12 may include an image sensor with an instantaneous shutter.

Primary camera 12 may sample incident light to form digital image 20. The sampling of the light may occur during a sample period $T_s$. Digital image 20 may include an image blur that may be caused by a motion of device 10 during the sample period $T_s$. The motion of device 10 may cause image blur of differing degrees to different areas of the light sensing elements (e.g., pixels, rows of pixels or columns of pixels) in primary camera 12. This may be because, different rows of the array of primary camera 12 sample light from a common source at different subintervals of the sample period $T_s$.

Secondary camera 14 using the array of light sensing elements, may sample light to form digital images 30. Secondary camera 14 may be configured to acquire images with a spatial resolution (i.e., pixels per image) that is less than primary camera 12. In certain embodiments the spatial resolution of these images may be in the range of 20 by 20 to 100 by 100 pixels. Other spatial resolutions are also possible.

Secondary camera 14 may sample the digital images 30 during sample period $T_s$. Secondary camera 14 may acquire the series of digital images 30 at a rate that is selected either by the user or set automatically based on the sample period $T_s$ of primary camera 12. As the rate which secondary camera 14 acquires the digital images increases, the accuracy of the instantaneous motion (i.e., motion vectors) of device 10 may be improved. Secondary camera 14 may generate digital images 30 at a rate sufficient for differences between successive digital images in the series of digital images 30 to enable a determination of the motion of device 10. For example, if primary camera 12 acquires 5 images per second and includes 1000 rows of pixels with a rolling shutter of 5 rows, then secondary camera 14 may be set to acquire 1000 images per second to correct the image blur on a row-by row basis. As another examples, secondary camera 14 may acquire digital images 30 at a rate between 100 to 1000 images per second, although other rates are also possible.

It is contemplated that the rate of image acquisition of secondary camera 14 may be sufficient to generate 2 to 1000 images during the sample period $T_s$ of primary camera 12.

Images 20 and 30 may be stored in image processor 16 or in one or more memories (not shown).

In certain embodiments, device 10 may include image processor 16 for determining a set of motion vectors 44 in response to digital images 30. The motion vectors 44 may indicate the motion of device 10 during sample period $T_s$ (e.g., the acquisition period of digital image 20 by primary camera 12).

Motion vectors 44 may be generated by image processor 16 at a relatively fast rate (e.g., between 100 to 1000 motion vectors/second). Motion vectors 44 may be determined concurrently with sample period $T_s$ or after sample period $T_s$. Respective motion vectors 44 or average motion vectors (the motion of device 10 averaged over respective periods) may be based on the sample period for one row or multiply rows (i.e., subintervals of the sample period T). These motion vectors 44 may be applied to adjust the signal level of the corresponding row or rows of digital image 20 as they are affected by motion of device 10.

Motion vectors 44 derived from the series of digital images 30 may be used to perform blur correction to digital image 20 using known digital image processing techniques. A known processing technique for image blur correction is disclosed by S. Chitale et al. entitled "Blur Identification and Correction for a Given Imaging System" published in 1999 in Southeastcon '99 Proceedings IEEE, which is incorporated herein by reference.

Alternatively, motion vectors 44 derived from digital images 30 may be used to counter motion of device 10 during sample period $T_s$. For example, device 10 may include a mechanism for adjusting the physical orientation of the imaging array of primary camera 12 to counter any effect of motion by device 10.

In various embodiments, primary camera 12 may generate a video image (e.g., a series of image frames). One skilled in the art understands that the motion vectors derived from digital images 30 using secondary camera 14 may be used to perform blur correction or image stabilization of video images generated by primary camera 12. The video blur correction or image stabilization may be performed using image processing or using an opto-mechanical mechanism that compensates for motion of device 10.

Although the output signal of image processor 16 is shown as motion vectors 44, it is contemplated that other outputs may be included such as image blur correction parameters 32, zoom positions and focus positions. That is, image processor 16 may receive: (1) digital images 30 from secondary camera 14; and (2) other image correction parameters, zoom positions, focus positions and/or the relative viewing orientation of the first and second cameras using detection unit 25. The image processor 16 may then generate and output blur correction parameters based on calculated motion vectors 44 and the received image correction parameters.

Figure 2A:
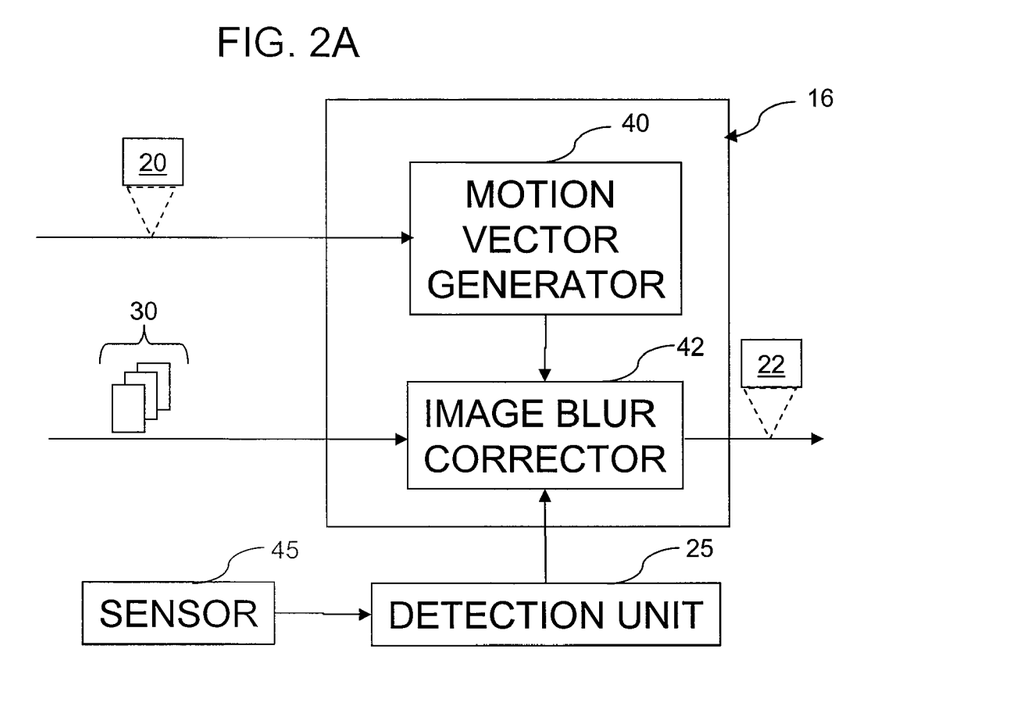
FIG. 2A is a block diagram illustrating an image processor that performs image blur correction in accordance with an embodiment of the invention.

FIG. 2A is a block diagram illustrating image processor 16 in accordance with another embodiment of the invention. As shown, image processor 16 performs image blur correction. The image processor 16 obtains (i) other image correction parameters, zoom positions, focus positions and the relative viewing orientation of primary and secondary cameras 12 and 14 using detection unit 25; (ii) digital image 20 from primary camera 12 (or a storage device; not shown); and (iii) the series of digital images 30 from secondary camera 14 (or the storage device). In response to these input signals, image processor 16 generates blur corrected image 22. The blur corrected image 22 reduces image blur caused by motion of device 10.

Image processor 16 includes motion vector generator 40 and image blur corrector 42. Motion vector generator 40 generates motion vectors 44 in response to digital images 30. Image blur corrector 42 generates blur corrected image 22 in response to motion vectors 44.

The device 10 may include mechanisms affecting the image blur of digital image 20. For example, primary camera 12 may include a zoom mechanism that magnifies the image blur in digital image 20. Similarly, primary camera 12 may include an auto-focus mechanism that affects the image blur in digital image 20. The image processor 16 may capture and store positions of the zoom mechanism and the auto-focus mechanism concurrent with the sampling of digital images 30 for subsequent use in image blur correction.

The image processor 16 may also store timestamps. For example, image processor 16 may capture and store timestamps corresponding to each of the digital images 30. Further, image processor 16 may capture and store information regarding the position of the auto-focus mechanism, the position of the zoom mechanism and/or the relative viewing orientation of secondary camera 14 to primary camera 12 immediately prior to the start of sampling of a row of pixels of primary camera 12. The timestamps may be stored at the start of the sampling of each row and other timestamps may be stored which are related to the auto-focus and zoom mechanism positions and the relative viewing orientation of primary and secondary cameras 12 and 14.

In certain embodiments image blur correction may be selectively disabled via an external control signal to image processor 16. In these embodiments, the user may select to read out image blur correction parameters 32 either separately or together with digital image 20 to enable image blur correction external to device 10. The timestamps may be used to externally correct digital image 20.

In certain embodiments, image processor 16 may generate a set of blur correction parameters 32 for digital image 20. The blur correction parameters 32 may include the following.
 (1) motion vectors in a first direction (the X direction) taken at a predetermined rate;
 (2) motion vectors in a second direction (the Y direction) taken at the predetermined rate;
 (3) rotation vectors taken at the predetermined rate;
 (4) time stamp for each motion and rotation vector;
 (5) zoom position of the primary camera, for example, taken immediately prior to the start of sampling for predetermined rows (e.g., each row) of the digital image from the primary camera;
 (6) auto-focus position of the primary camera, for example, taken immediately prior to the start of sampling for predetermined rows (e.g., each row) of the digital image of the primary camera; and
 (7) relative orientation of the secondary camera with respect to the primary camera, for example, taken immediately prior to the start of sampling for predetermined rows (e.g., each row) of the digital image.

In certain embodiments, blur correction parameters 32 may also include an auto-focus and/or a zoom feature of secondary camera 14. The blur correction parameters may further include one or more of the following:
 (i) zoom position of the secondary camera, for example, taken immediately prior to the start of sampling for predetermined rows (e.g., each row) of the digital image; and (ii) auto-focus position of the secondary camera, for example, taken immediately prior to the start of sampling for predetermined rows (e.g., each row) of the digital image.

Although it is illustrated that the zoom positions and auto-focus positions are acquired (taken) at the start of the sampling for predetermined rows, it is contemplated that these positions may be acquired at the start of the sampling of a new frame of image data. Moreover, it is contemplated that the acquisition of the motion vectors and other parameters may be at other times, such as during sampling of certain rows or after sampling of those rows. That is, these parameters may be acquired anytime during the sampling of the rows, so long as the parameters have an associated timestamp or a defined timeframe associated with each parameter.

The secondary camera 14 may have a fixed orientation with respect to primary camera 12. One skilled in the art understands that the blur correction algorithm may include variables to account for the fixed orientation, or these variables may be hardwired into image processor 16.

Figure 2B:
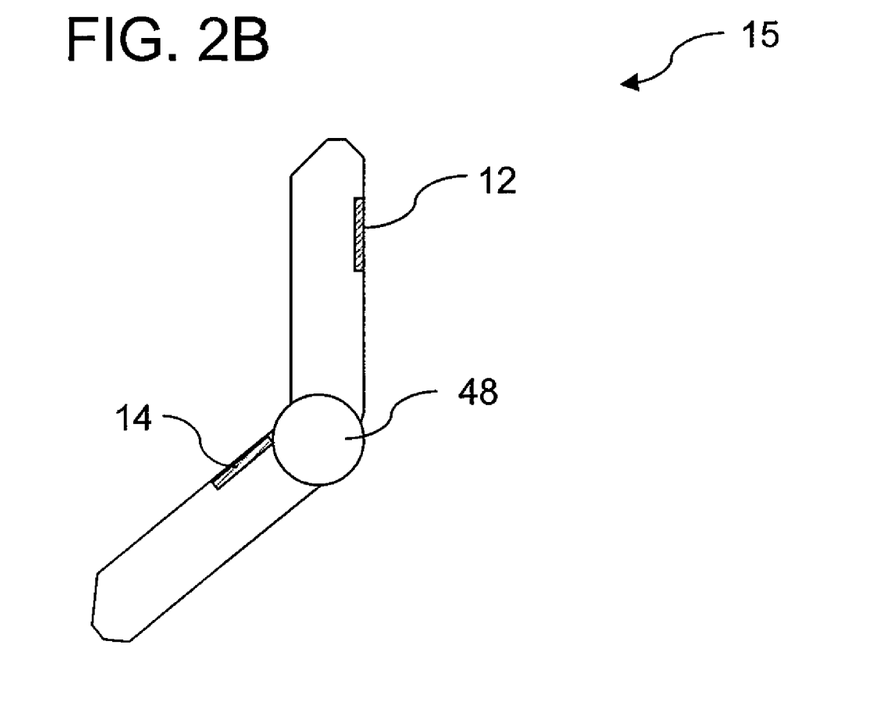
FIG. 2B is a side view illustrating a device in accordance with another embodiment of the invention.

FIG. 2B is a schematic diagram illustrating a device 15 in accordance with another embodiment of the invention. As shown in FIG. 2B, device 15 includes primary camera 12 and secondary camera 14. The secondary camera 14 may be movable with respect to primary camera 12. The device 15 includes a sensor 45 (see FIG. 2A) to sense the relative position of secondary camera 14 with respect to primary camera 12. The sensor 45 may be an optical sensor, a capacitive sensor or any other position-type sensor. For example, device 15 may be a flip-type cellular phone in which one of primary and secondary cameras 12, 14 may be disposed on a flip portion of the cellular phone and the other one of these cameras 12, 14 may be disposed on the other portion of the cellular phone. In this configuration, the relative viewing orientation of the cameras is not fixed. Sensor 45 may be located at hinge 48 of the flip phone such that the rotation of hinge 48 may be sensed. Alternately, one or more switches may be embedded in a hinged portion. These switches may be actuated by the rotation of the two arms of the phone. In this configuration, actuation of one or more switches may be sufficient to sense the rotation of one camera with respect to the other camera.

In one embodiment, device 15 may support first and second relative viewing orientations (for example, a first viewing orientation, when the flip phone is open and a second viewing orientation when it is closed) of primary and secondary cameras 12, 14. When the hinge position indicates that device 15 is opened, an orientation switch may be one of open or short circuited. Moreover, when the hinge position indicates that device 15 is closed, an orientation switch may be the other one of open or short circuited.

In certain embodiments, sensor 45 may determine the viewing direction of primary camera 12 relative to that of secondary camera 14 (i.e., whether the viewing direction is the same or in a reversed viewing direction, e.g., 180° from the primary camera's direction). The relative viewing direction of the primary and secondary cameras 12 and 14 may be based on an angle between their respective optical axes. The sensor 45 of device 15 may detect the angle between the optical axes an provide the sensed angle to image processor 16.

Although a series of images 30 are illustrated for use in image blur correction, it is contemplated that two images from secondary camera 14 may be used to correct image blur of digital image 20. If so, secondary camera 14 may acquire digital images 30 at a lower rate, for example, between 10 to 100 frames per second.

Any number of different processes may be used to collect and store blur correction parameters 32. The blur correction parameters 32 may be stored in memory in device 10 and either read out with the image data or separately read out from the image data. In certain embodiments, the stored blur correction parameters may be processed by image blur corrector 42.

As examples, image processor 16 may: (i) embed blur correction parameters 32 in digital image 20 using a predefined format; (ii) read out blur correction parameters 32 together with digital image 20 without embedding them into the image; or (iii) correct the blurred image based on blur correction parameters 32 and read out blur corrected image 22. Other embodiments allow blur correction to be performed externally to device 10 (e.g., digital image 20 with blur correction parameters 32 may be transferred to a host computer for blur correction processing).

Figure 3:
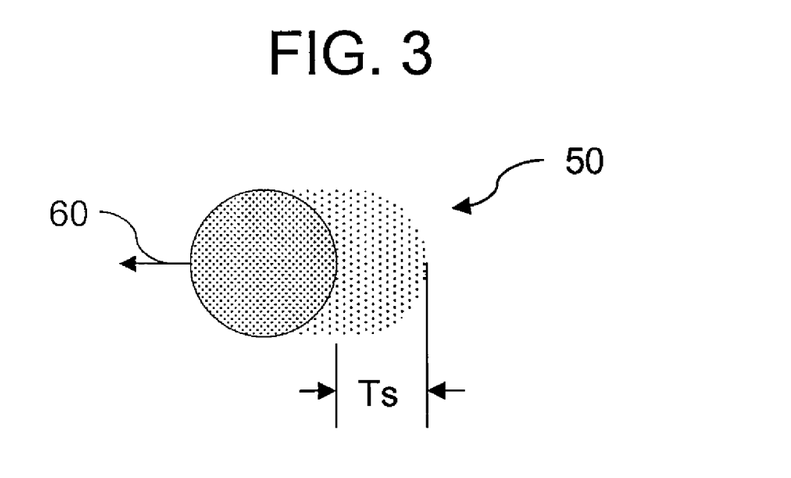
FIG. 3 is a diagram illustrating an example of image blur in a digital image.

FIG. 3 is a diagram illustrating an example of image blur in a digital image. As shown, a digital image includes object 50. Motion of device 10 during sample period $T_s$ causes an image blur of object 50. Vector 60 indicates the direction of motion of object 50 caused by movement of device 10 during sample period $T_s$. The time interval during which object 50 leaves its imprint (image blur) in the digital image refers to its sample period $T_s$. Vector 60 may be derived from motion vectors 44, the relative orientation of primary camera 12 to secondary camera 14 and the other parameters provided by detection unit 25.

Blur correction may include subtracting the contribution of object 50 from blurred areas of the digital image. A blur correction applied to digital image 20 may be based on an assumption that object 50 is fixed relative to other objects in digital image 20 or that it moves in a predictable way with regard to the other objects (e.g., that the movement of object 50 corresponds to that of the other objects in the digital image 20).

Figure 4:
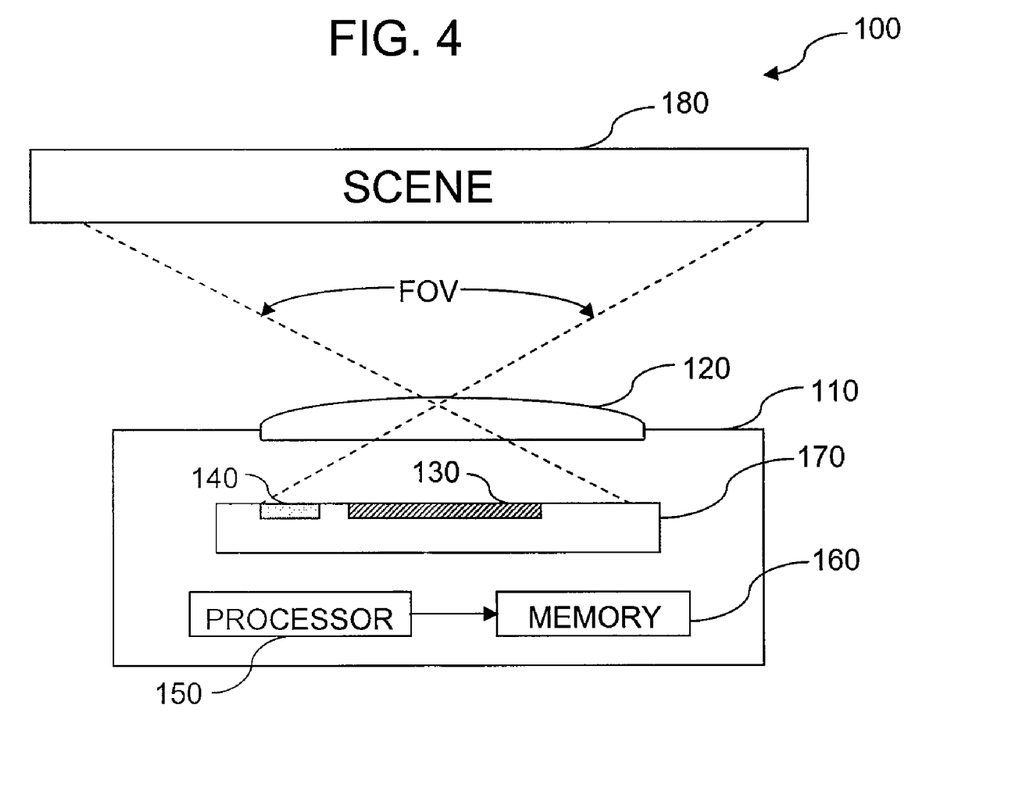
FIG. 4 is a schematic diagram illustrating a dual-image device in accordance with yet another embodiment of the invention.

FIG. 4 is a block diagram illustrating a dual-image device in accordance with yet another embodiment of the invention. As shown, device 100 includes enclosure 110, lens 120, first imager 130, second imager 140, processor 150 and memory 160. The first imager 130 and second imager 140 are provided on substrate 170, and each includes an array of imaging pixels (not shown). In certain embodiments, each of the imagers 130 and 140 may be formed using CMOS (complementary metal-oxide semiconductor) type pixels. Other known fabrication techniques are also possible.

The first imager 130 may have a higher spatial resolution (i.e., number of pixels) than second imager 140.

Lens 120 focuses light from a scene 180 in a field of view (FOV) onto an image plane at substrate 170. The first and second imagers 130 and 140 are positioned to receive the focused light from lens 120. The first imager 130 is configured to acquire an image during an integration period $T_s$. The image acquisition may be based on a rolling shutter technique or an instantaneous shutter technique.

A rolling shutter generally refers to a technique in which a few rows of pixels (e.g., a portion of the image array) acquires the incoming light at one time. The acquisition period (e.g., integration period) for a particular row is offset such that acquisition of the image occurs in steps (in a rotational pattern). First imager 130 acquires a frame of an image by reading out the acquired row of pixels in the same rotational pattern. For example, after the bottom row of first imager 130 starts its integration, the process rolls to the top row of first imager 130 to begin acquisition of the next frame. Thus, acquisition and readout is a continuous process.

An instantaneous shutter generally refers to a technique in which each of the rows of pixels of the array acquires incoming light at one time and readout occurs thereafter to generate the image of a frame.

In certain embodiments, second imager 140 may have a lower spatial resolution than first imager 130 and may use an instantaneous shutter technique to improve the estimation of motion vectors 44 of camera 100.

When device 100 moves during integration period Ts, the image acquired by first imager 130 is image blurred. The extent of the image blur depends on, for example, speed of the movement, acquisition time of the image, and the zoom and focus position settings of camera 100.

Second imager 140 is configured to acquire a series of images during integration period $T_s$ of first imager 130. The processor 150 may compare (correlate) common features in the images from second imager 140 to calculate the motion vectors 44 of device 100.

It is contemplated that the motion vectors may be calculated for each consecutive pair of images in the series or the motion may be averaged over a series of images. Each motion vector may be timestamped with a time corresponding to when the motion is detected.

Because first and second imagers 130 and 140 are located together in device 100, they experience the same motion vectors such that the images from first imager 130 may be corrected based on the motion vectors calculated using second imager 140.

In certain embodiments, device 100 may use a red eye reduction or preprocessing image technique. In these embodiments, it is contemplated that image capture by second imager 140 may begin based on a triggering mechanism for the red eye reduction or the preprocessing image technique.

The calculation of motion vectors 44 of device 10 is based on: (i) an object in the field of view being stationary; or (ii) the object moving consistently (e.g., at an average velocity). It is contemplated that the motion vectors of first and second imagers 130 and 140 may be correlated from a portion of scene 180 within the field of view of second imager 140. For example, certain stationary features of the image may be selected, such as a building, a tree or a boulder to calculate the motion vectors.

In certain embodiments, image processor 16 may calculate additional motion vectors of further objects from digital images 30 to determine an average velocity of the object and further objects. The image blur correction of digital image 20 may be based on the calculated motion vectors and the determined average velocity of the object and further objects. That is, the motion vectors of device 100 may be based on the average velocity of the objects in the field of view.

In various embodiments, second imager 140 may generate images at a faster rate than first imager 130. That is, second imager 140 may have a greater temporal resolution. Moreover, second imager 140 may have a lower spatial resolution (i.e., less pixels per image).

Processor 150 may be configured to generate motion vectors for device 100 by calculating location differences based on stationary features common to the series of images from second imager 140. Based on the location differences, processor 150 may calculate the motion vectors indicative of motion in the x-axis and/or y-axis directions during the integration (capture interval) of first imager 130.

In certain embodiments, the calculated x and y motion vectors include first x and first y axis motion vectors with subsequent motion vectors differentially calculated (i.e., based on a difference between the previous and next motion vectors in the x and y directions). Such differential motion vectors allow for reduced memory storage capacity when the motion vectors are substantially constant. In other embodiments, the x and y motion vectors may be generated as calculated resultant vectors during each predetermined period (e.g., the period to capture an image by second imager 140 during the interval between each pair of consecutive images).

By positioning first imager 130 and second imager 140 on a common substrate 170, lens 120 may be shared to reduce the cost of the system over other configurations in which the first and second imagers do not share such a lens.

Figure 5:
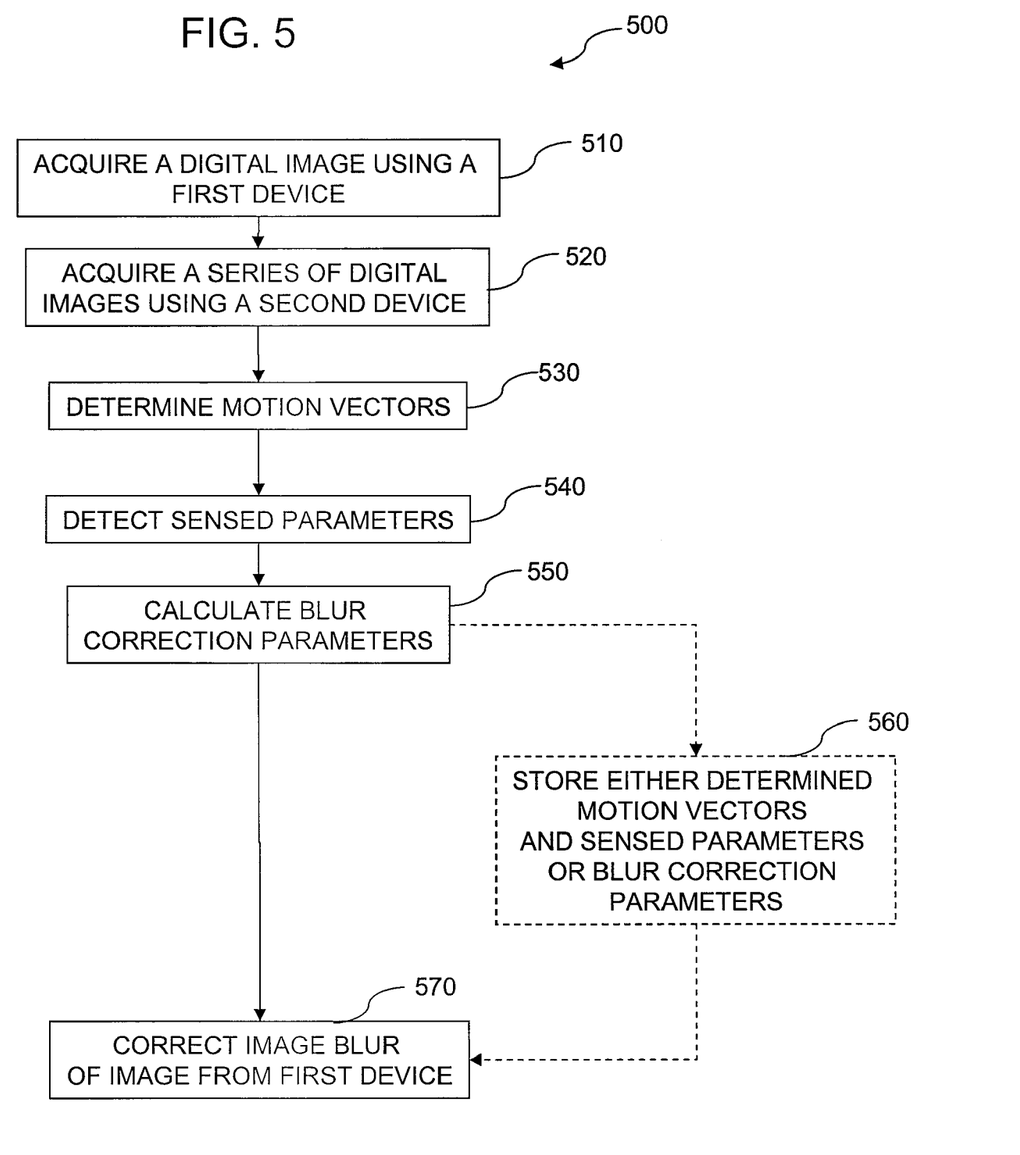
FIG. 5 is a flowchart illustrating a method of image blur correction in accordance with yet another embodiment of the invention.

FIG. 5 is a flowchart illustrating a method 500 in accordance with yet another embodiment of the invention. In step 510, first device 12 acquires digital image 20. At step 520, second device 14 acquires a series of digital images 30 during sample period $T_s$ of first device 12.

At step 530, motion vector generator 40 of image processor 16 receives digital images 30 to determine motion vectors 44 to be applied to digital image 20.

At step 540, detection unit 25 detects sensed parameters. The sensed parameters may include, for example, (1) the zoom position of first device 12 and/or the second device 14; (ii) the focus position of these devices; and/or (iii) relative viewing orientation of these devices.

At step 550, image processor 16 calculates image blur correction parameters 32 from the determined motion vectors 44 and sensed parameters.

At optional step 560, image processor 16 may store in memory (its memory or another memory): (i) motion vectors 44 and sensed parameters or (2) calculated blur correction parameters 32, for example, to be read out to externally blur correct digital image 20.

At step 570, image processor 16 or another external device may correct image blur of the image from first device 12 based on blur correction parameters 32.

Although the invention is described in terms of a device having a primary and a secondary camera on a substrate, it is contemplated that portions of the device may be implemented on multiple substrates or in software on microprocessors, ASICs or general purpose computers (not shown). In various embodiments, one or more of the functions may be implemented in software that controls a general purpose computer. This software may be embodied in a tangible computer readable carrier, for example, a physical computer readable medium (i.e., a magnetic disk, an optical disk or a memorycard) or an audio frequency, radio-frequency, or optical carrier.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A device, comprising:
  a first camera using a rolling shutter for acquiring a first image having a plurality of rows of pixels;
  a second camera for acquiring a set of digital images of an object at a higher image acquisition rate than an image acquisition rate of the first camera such that the higher image acquisition rate is sufficient to calculate a motion vector of the object for individual blur correction of each row of pixels of the first image; and
  a processor for sequentially calculating each motion vector of the object based on the set of images of the object from the second camera, wherein:

the processor provides the individual blur correction for a respective row of pixels of the first image based on one of the sequentially calculated motion vectors corresponding in time to a time of capture of the first image by the respective row of pixels.

2. The device of claim 1, wherein the object is stationary and image blur is caused by movement of the first camera.

3. The device of claim 1, wherein the processor calculates motion vectors of further objects from the set of digital images to determine an average velocity of the object and further objects and provides the individual blur corrections of the first image based on the determined average velocity of the object and further objects.

4. The device of claim 1, further comprising a sensor for detecting an orientation angle between the first and second cameras, wherein:
the first and second cameras have different viewing orientations, and
the processor provides the individual blur corrections of the first image based on the calculated motion vectors and the detected orientation angle.

5. The device of claim 1, wherein the processor calculates the motion vectors for the individual blur corrections of the first digital image at times during image acquisition of the first image.

6. The device of claim 5, wherein each of the sequentially calculated motion vectors has a timestamp associated therewith such that the individual blur corrections or a respective one or ones of rows of pixels in the first camera is based on the respective motion vectors occurring at a time of image capture of the respective one or ones of the rows of pixels.

7. The device of claim 1, further comprising:
a detection unit to detect at least one of: (i) an auto focus position of the first camera; or (ii) a zoom position of the first camera,
wherein the image processor calculates the blur correction parameters based on the at least one detected zoom or auto-focus position of the first camera.

8. The device of claim 1, wherein the higher image acquisition rate of the second camera is in the range of about 2 to 1000 times faster than the image acquisition rate of the first camera.

9. The device of claim 1, wherein the processor derives blur correction parameters based the sequentially calculated motion vectors and at least one of: (i) a zoom position of the first camera; (ii) an auto-focus position of the first camera or (iii) a relative viewing orientation of the second camera with respect to the first camera.

10. The device of claim 9, wherein the relative viewing orientation of the second camera with respect to the first camera is a predetermined orientation.

11. The device of claim 9, further comprising:
an orientation switch configured to sense one of: (1) when the second camera is in a first relative position with respect to the first camera or (2) when the second camera is in a second relative position with respect to the first camera, wherein the processor provides the individual blur corrections based on the sensed relative position.

12. The device of claim 1, wherein the processor embeds the individual blur corrections of the first image in the first image.

13. The device of claim 1, wherein the first image and the individual blur corrections of the first image are readout together.

14. The device of claim 1, further comprising:
a memory, wherein the processor corrects the first image based on the individual blur corrections and the memory stores and reads out a blur corrected first image.

15. The device of claim 1, wherein the first camera includes a first imager and the second camera includes a second imager such that the first and second imagers are deposed on a common substrate and share a common lens.

16. The device of claim 15, wherein the processor and the first and second imagers are formed on the common substrate.

17. A method of correcting image blur using first and second imaging devices, the first and second imaging devices having different viewing orientations, comprising the steps of:
acquiring, by the first imaging device, a first image having a plurality of rows of pixels using a rolling shutter;
acquiring a set of digital images of an object using the second imaging device;
setting an image acquisition rate of the second camera at a higher image acquisition rate than an image acquisition rate of the first camera such that the higher image acquisition rate is sufficient to calculate a motion vector of the object for individual blur correction of each row of pixels of the first image;
sequentially calculating each motion vector of the object based on the set of images of the object from the second camera; and
deriving an individual blur correction for each respective row of pixels of the first image based on a respective one of the sequentially calculated motion vectors corresponding in time to a time of capture of the first image by the respective row of pixels.

18. The method of claim 17, further comprising the step of:
calculating motion vectors of further objects from the set of digital images;
determining an average velocity of the object and further objects; and
deriving the individual blur correction of the first image based on the determined average velocity of the object and further objects.

19. The method of claim 17, further comprising the steps of:
detecting an orientation angle between the first and second cameras; and
deriving the individual blur corrections of the first image based on the sequentially calculated motion vectors and the detected orientation angle.

20. The method of claim 17, wherein:
the step of sequentially calculating the motion vectors of the object includes the steps of:
comparing pairs of the respective images of the acquired set of digital images;
calculating the motion vectors of the second imaging device based on the comparison of the pairs of the respective images; and
the step of deriving the individual blur corrections of the first image includes
translating the sequentially calculated motion vectors of the second imaging device to blur correction parameters in accordance the orientation angle detected during the acquisition of the pairs of the respective images.

21. The method of claim 20, wherein:
the step of sequentially calculating the motion vectors includes timestamping each of the motion vectors with an associated timestamp; and
the step of deriving the individual blur corrections of the first image includes matching one of the sequentially calculated motion vectors to one row of pixels of the first image based on the associated timestamp corresponding to the time when the first image is captured for the one row of pixels of the first image;

adjusting an intensity of the respective row of pixels of the first image in accordance with the translated blur correction parameters derived from the sequentially calculated motion vectors of the second imaging device.

22. The method of claim 17, further comprising the step of:
storing the sequentially calculated motion vectors and the corresponding detected orientation angle for respective pairs of the set of digital images of the second imaging device.

23. A physical computer readable medium to store program code for execution on a computer to implement the method according to claim 17.

24. An apparatus for correcting an image blur of a first digital image of a first imager, comprising:
 a second imager in a predetermined orientation with respect to the first imager for acquiring a plurality of further digital images while the first imager samples the first digital image; and
 an image processor for receiving (i) the first digital image having the image blur and (ii) the plurality of further digital images from the second imager, for determining blur correction parameters based on a motion of the first imager using the acquired plurality of further digital images from the second imager and for applying the blur correction parameters to the first digital image having the image blur to reduce or substantially eliminate the image blur from the first digital image, wherein:
the first imager uses a rolling shutter;
the first digital image has a plurality of rows of pixels;
the second imager has a higher image acquisition rate than an image acquisition rate of the first imager such that the higher image acquisition rate is sufficient to determine individual blur corrections of each row of pixels of the first image; and
the image processor determines the individual blur corrections for each respective row of pixels of the first digital image based on calculated motion vectors corresponding in time to a time of capture of the first image by the respective row of pixels.

* * * * *